3,079,443
Patented Feb. 26, 1963

3,079,443
PRODUCTION OF A SOLUTION OF DIACETYL PEROXIDE IN ACETIC ANHYDRIDE
Jasper H. Barrett, La Marque, Tex., Jack C. Wright, Plainfield, N.J., and Billy B. Cowser, San Pedro, Calif., assignors to Union Carbide Corporation, a corporation of New York
No Drawing. Filed July 2, 1957, Ser. No. 669,426
11 Claims. (Cl. 260—610)

This invention relates to chemical processes. More particularly it is directed to improved processes for making diacetyl peroxide.

A reaction medium, a liquid, is required in the making of diacetyl peroxide by the reaction of hydrogen peroxide with acetic anhydride. A number of liquids have been suggested for this reaction medium in the past. Inasmuch as the principle use of diacetyl peroxide is to catalyze polymerization reactions, it has been suggested to use, as the reaction medium for the production of diacetyl peroxide, the same monomer which is to be later polymerized by the use of diacetyl peroxide as the catalyst. Other liquids suggested were high boiling phthalic esters which may be introduced into a polymerization reaction. Using such media introduces a foreign material into the reaction and into the diacetyl peroxide product, and frequently limits the use of the product to catalyzing one particular polymerization reaction.

We have now discovered that diacetyl peroxide can be produced in good yield by reacting hydrogen peroxide with acetic anhydride in a stoichiometric excess of acetic anhydride as the reaction medium, in the presence of a minor amount of a metal compound catalyst, one of certain compounds of cadmium or certain of the alkali and alkali earth metals. In the process of the invention conversion of 100 percent by weight of the hydrogen peroxide to diacetyl peroxide is possible, and conversion of 85 percent by weight or more is readily attained. The diacetyl peroxide product of our process is in solution in acetic anhydride, free of any materials foreign to the reaction producing it. When diacetyl peroxide is prepared and handled in acetic anhydride solution, the advantage of a high boiling solvent is obtained and yet because it is in a non-polymerizable medium it can be used in any polymerization system. That is, an unwanted monomer is not introduced into a given polymerization system.

It is essential to the process of our invention that there be a molar or stoichiometric excess of unreacted acetic anhydride over unreacted hydrogen peroxide at all times during the reaction. This excess must be such that there be at least 3 mols of unreacted acetic anhydride for each mol of unreacted hydrogen peroxide present in the reaction mixture. We prefer that there be at least 5 mols of unreacted acetic anhydride per mol of unreacted hydrogen peroxide. This molar excess insures that the diacetyl peroxide product will be in low concentration in solution in acetic anhydride. It is preferred that the concentration of diacetyl peroxide in the product not exceed 30 percent by weight in order to insure safety in a routine production operation. Somewhat higher concentrations can be tolerated if the process is closely controlled and special precautions are taken. It is a further advantage of our process that it may be operated as either a batch or continuous process, as desired.

In the batch method of operation acetic anhydride is placed in a reaction vessel and cooled. A small amount of metal compound catalyst is added and the hydrogen peroxide feed is begun. The reaction vessel is agitated, normally with materials such as air or nitrogen. When the process is operated as a continuous process the reactor vessel or reaction chamber is preferably a tube or coil which is cooled in a convenient manner. Acetic anhydride, hydrogen peroxide and a metal compound catalyst are separately and concurrently fed into the inlet end of this tube and the product is continuously withdrawn from the other end. If desired, the acetic anhydride and metal compound catalyst are mixed and fed to the reaction vessel together rather than separately.

Pressure is not critical in the process and it is normally operated at atmospheric pressure either as a batch or continuous process. The reaction of acetic anhydride with hydrogen peroxide is exothermic and therefore the reaction mixture must be continuously cooled in order to control the reaction. The process is operable at a temperature between 0° C. and 25° C. At temperatures below 0° C. the reaction is too slow to be practical and at temperatures above 25° C. the reaction becomes difficult to control. When operated as a batch process, the preferred temperature range is from 0° C. to 15° C., with the optimum temperature range for batch operation from 0° C. to 10° C. With continuous operation the optimum temperature range is somewhat higher, being between 10° C. and 25° C.

The proper catalyst is essential to the successful process of the invention in either the batch or continuous embodiment. We have found that catalysts useful in the process of the invention are sodium hydroxide, calcium hydroxide, barium hydroxide, cadmium oxide, calcium carbonate, calcium acetate, strontium hydroxide, trisodium phosphate, magnesium acetate. In considering catalysts or activators for our process we tested a number of compounds which were found to be of no value as catalysts or initiators. These unworkable compounds included aluminum hydroxide, ferric chloride, ferric sulfate, sodium chloride, calcium nitrate, cadmium stearate and cadmium chloride. Only a relatively small proportion of catalyst is required for successful operation of the process. From 0.075 to 0.60 part by weight of catalyst per 100 parts of acetic anhydride are operable in the processs with between 0.20 and 0.60 parts by weight preferred.

Inasmuch as the hydrogen peroxide is conveniently introduced into the reaction mixture in aqueous solution, i.e., a 35 percent aqueous solution, the product solution at the conclusion of the reaction may contain a substantial quantity of water, as much as 10 percent by weight. This water content can be greatly reduced by permitting the temperature of the reaction mixture to rise to about 30° C. at which temperature the acetic anhydride in the solution will react with the water to form acetic acid. The presence of a small quantity of acetic acid in the product solution is not ordinarily undesirable, whereas water may be.

The process is operable with catalyst concentrations above 0.60 part by weight per 100 parts of acetic anhydride, but such higher concentrations do not result in any appreciable increase in efficiency of conversion of the acetic anhydride to diacetyl peroxide.

*Example I*

The reaction vessel consisted of a 2 gallon capacity stainless steel tank-type vessel equipped with an interior cooling coil, made of 5/8 inch diameter stainless steel tubing and containing brine, and an ebullition pipe through which air could be admitted for agitation. One part by weight of calcium hydroxide and 670 parts of acetic anhydride were charged to the vessel. Air agitation was begun and 125 parts by weight of 35 percent strength aqueous hydrogen peroxide solution were fed to the reaction vessel at such a rate as to maintain the reaction temperature between 0° C. and 10° C. The reaction temperature was also controlled by the amount of cold brine circulated through the cooling coil in the vessel.

Whenever the temperature rose to 10° C. the hydrogen peroxide feed was cut off and the contents of the reaction vessel were allowed to cool to a temperature of 0° C., after which the hydrogen peroxide feed was again commenced.

When all of the hydrogen peroxide had been fed into the reaction vessel the temperature within the vessel was allowed to rise to 10° C. by stopping the flow of brine through the cooling coil. This procedure of permitting the temperature to rise insured completion of the reaction. When the temperature of 10° C. had been reached the contents of the reaction vessel were cooled back down to a temperature of 0° C. by passing more brine through the cooling coil.

The contents of the reaction were then filtered, and analyzed. The reaction product was found to contain 19.3 percent by weight of diacetyl peroxide, representing a 97.6 percent conversion of hydrogen peroxide to diacetyl peroxide. The addition of hydrogen peroxide during the reaction was at such a rate that the molar ratio of unreacted acetic anhydride to unreacted 100 percent strength hydrogen peroxide was never permitted to fall below 3 to 1.

*Example II*

The equipment, reactants, quantities of reactants, conditions and procedure were all identical with Example I. Upon analysis the reaction product was found to contain 18.0 percent by weight of diacetyl peroxide, representing a 91.0 percent conversion of hydrogen peroxide to diacetyl peroxide.

*Example III*

The equipment, reactants, quantities of reactants, conditions and procedures were all identical with Example I. Upon analysis the reaction product was found to contain 19.8 percent by weight of diacetyl peroxide, representing a 100 percent conversion of hydrogen peroxide to diacetyl peroxide.

*Example IV*

The equipment, reactants, quantities of reactants, conditions and procedures were all identical with Example I. Upon analysis the reaction product was found to contain 18.9 percent by weight of diacetyl peroxide, representing a 95.5 percent conversion of hydrogen peroxide to diacetyl peroxide.

*Example V*

The equipment, reactants and quantities of reactants were identical with Example I. The operating conditions and procedures were also identical except that the operating temperature was between 0° C. and 15° C., the temperature being allowed to rise to 15° C. before stopping the addition of hydrogen peroxide and cooling the reaction mixture down. Upon analysis the reaction product was found to contain 17.4 percent by weight of diacetyl peroxide, representing an 87.9 percent conversion of hydrogen peroxide to diacetyl peroxide.

*Example VI*

The reaction vessel consisted of a 10 foot long stainless steel coiled reaction tube of ¼ inch inside diameter, immersed in a cooling bath. Separate ducts to the inlet end of the reaction tube were provided for the concurrent introduction of hydrogen peroxide and a mixture of calcium hydroxide and acetic anhydride. A mixture of 0.45 part by weight of calcium hydroxide and 100 parts by weight acetic anhydride was introduced into the inlet end of the reaction tube separately and concurrently with 25 parts by weight of 35 percent strength aqueous hydrogen peroxide solution. These proportions provided a 4 to 1 molar ratio of unreacted acetic anhydride to unreacted 100 percent strength hydrogen peroxide in the feed streams.

The rate of feed of reactants was such as to provide a residence time in the reaction tube of four minutes. The temperature of the cooling bath was maintained at 10° C. Analysis of the product showed a conversion of 70 percent of the hydrogen peroxide to diacetyl peroxide.

*Example VII*

The reaction vessel consisted of a 10 foot long stainless steel coiled reaction tube of ¼ inch inside diameter, immersed in a cooling bath. Separate ducts to the inlet end of the reaction tube were provided for the concurrent introduction of calcium hydroxide, acetic anhydride and hydrogen peroxide. There were separately and concurrently introduced into the inlet end of the reaction tube 100 parts by weight of acetic anhydride, 0.45 part by weight of calcium hydroxide and 25 parts by weight of hydrogen peroxide. These proportions provided a 4 to 1 molar ratio of unreacted acetic anhydride to unreacted 100 percent strength hydrogen peroxide.

The rate of feed of reactants was such as to provide a residence time in the reaction tube of four minutes. The temperature of the cooling bath was maintained at 25° C. Analysis of the product showed a conversion of the hydrogen peroxide to diacetyl peroxide in excess of 99 percent.

*Example VIII*

Compounds were tested as catalysts or initiators for the reaction of acetic anhydride with diacetyl peroxide in the following manner. A small reaction vessel was employed, surrounded by a cooling bath which was cooled to a temperature of 0° C. First 25 milliliters of acetic anhydride and then 0.16 gram of the compound being tested as a catalyst were placed in the vessel. Then 5 milliliters of 35 percent strength aqueous hydrogen peroxide were added. Time and temperature were recorded from the instant of addition of the hydrogen peroxide. The peak temperature and time required to reach it were recorded for each compound being tested. A temperature increase in 5 minutes or less showed the compound to be useful as an initiator or catalyst.

Results of the tests were as follows:

| Chemical initiator | Initial temperature, °C. | Peak temperature, °C. | Time to reach peak temperature, sec. |
| --- | --- | --- | --- |
| Calcium hydroxide | 0 | 21 | 225 |
| Calcium acetate | 0 | 23 | 180 |
| Cadmium oxide | 0 | 8 | 180 |
| Magnesium acetate | 0 | 7 | 120 |
| Strontium hydroxide | 0 | 20 | 270 |
| Barium hydroxide | 0 | 15 | 300 |
| Sodium hydroxide [1] | 0 | 28 | 105 |
| Trisodium phosphate | 0 | 13 | 180 |

[1] Rather than 0.16 gram, 0.3 milliliter of 50 percent aqueous sodium hydroxide was used.

What is claimed is:

1. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of a compound selected from the group consisting of calcium hydroxide, calcium acetate, cadmium oxide, magnesium acetate, strontium hydroxide, barium hydroxide, sodium hydroxide and trisodium phosphate.

2. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of calcium hydroxide per 100 parts by weight of acetic anhydride.

3. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of calcium acetate.

4. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of sodium hydroxide.

5. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of strontium hydroxide.

6. Process for making diacetyl peroxide as a solution of diacetyl peroxide in a solvent consisting essentially of acetic anhydride which comprises reacting hydrogen peroxide with acetic anhydride in the presence of at least 3 mols of unreacted acetic anhydride per mol of unreacted hydrogen peroxide, at a temperature between 0° C. and 25° C. and in the presence of a minor amount of trisodium phosphate.

7. Process for making diacetyl peroxide as a solution of diacetyl peroxide in a solvent consisting essentially of acetic anhydride which comprises introducing hydrogen peroxide into a mixture of acetic anhydride and, per 100 parts by weight of acetic anhydride, from 0.075 to 0.60 part by weight of a compound selected from the group consisting of calcium hydroxide, calcium acetate, cadmium oxide, magnesium acetate, strontium hydroxide, barium hydroxide, sodium hydroxide and trisodium phosphate, the relative quantities of hydrogen peroxide and acetic anhydride being such as to provide at all times during the introduction of said hydrogen peroxide, at least 5 mols of unreacted acetic anhydride for every mol of unreacted hydrogen peroxide, the temperature in the reaction mixture being maintained between 0° C. and 15° C.

8. Process for making diacetyl peroxide as a solution of diacetyl peroxide in a solvent consisting essentially of acetic anhydride which comprises introducing hydrogen peroxide into a mixture of acetic anhydride and, per 100 parts by weight of acetic anhydride, from 0.075 to 0.60 part by weight of a compound selected from the group consisting of calcium hydroxide, calcium acetate, cadmium oxide, magnesium acetate, strontium hydroxide, barium hydroxide, sodium hydroxide and trisodium phosphate, the relative quantities of hydrogen peroxide and acetic anhydride being such as to provide at all times during the introduction of said hydrogen peroxide, at least 5 mols of unreacted acetic anhydride for every mol of unreacted hydrogen peroxide, the temperature in the reaction mixture being maintained between 0° C. and 10° C.

9. A continuous process for making diacetyl peroxide which comprises continuously introducing into a reaction chamber hydrogen peroxide and a mixture consisting of acetic anhydride and a minor amount of a compound selected from the group consisting of calcium hydroxide, calcium acetate, cadmium oxide, magesium acetate, strontium hydroxide, barium hydroxide, sodium hydroxide and trisodium phosphate, there being at least 3 mols of acetic anhydride introduced into the reaction chamber for each mol of hydrogen peroxide introduced, and the temperature within said reaction chamber being maintained be 10° C. and 25° C., and continuously withdrawing diacetyl peroxide from said reaction chamber.

10. A continuous process for making diacetyl peroxide which comprises continuously introducing into a reaction chamber hydrogen peroxide and a mixture consisting of acetic anhydride and a minor amount of calcium hydroxide, there being at least 3 mols of acetic anhydride introduced into the reaction chamber for each mol of hydrogen peroxide introduced, and the temperature within said reaction chamber being maintained between 10° C. and 25° C. and continuously withdrawing diacetyl peroxide from said reaction chamber.

11. A continuous process for making diacetyl peroxide which comprises continuously introducing into a reaction chamber hydrogen peroxide and a mixture consisting of acetic anhydride and a minor amount of sodium hydroxide, there being at least 3 mols of acetic anhydride introduced into the reaction chamber for each mol of hydrogen peroxide introduced, and the temperature within said reaction chamber being maintained between 10° C. and 25° C. and continuously withdrawing diacetyl peroxide from said reaction chamber.

References Cited in the file of this patent

UNITED STATES PATENTS

| | | |
|---|---|---|
| 2,458,207 | Rudolph et al. | Jan. 4, 1949 |
| 2,504,436 | McCoubrey et al. | Apr. 18, 1950 |